UNITED STATES PATENT OFFICE.

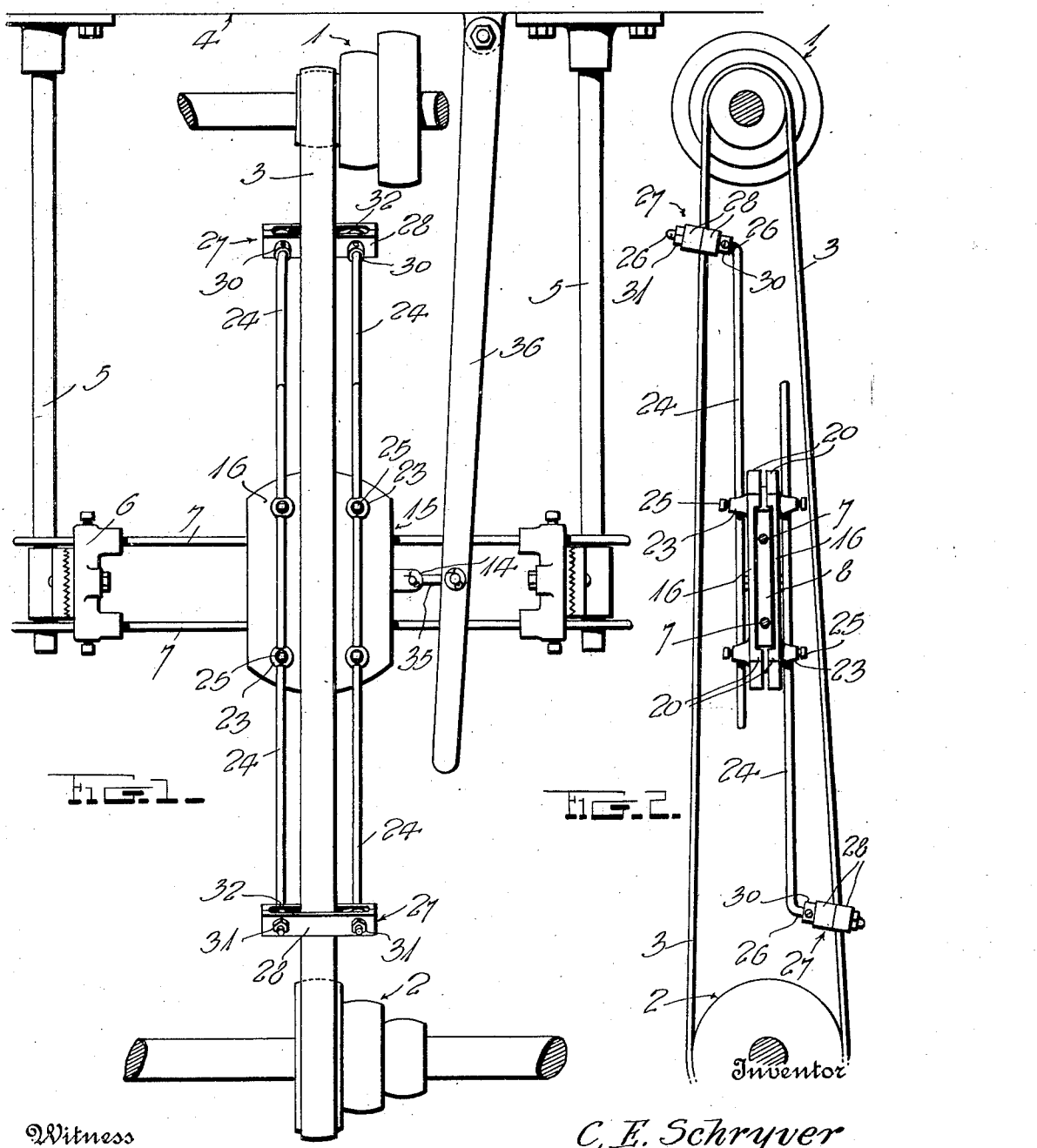

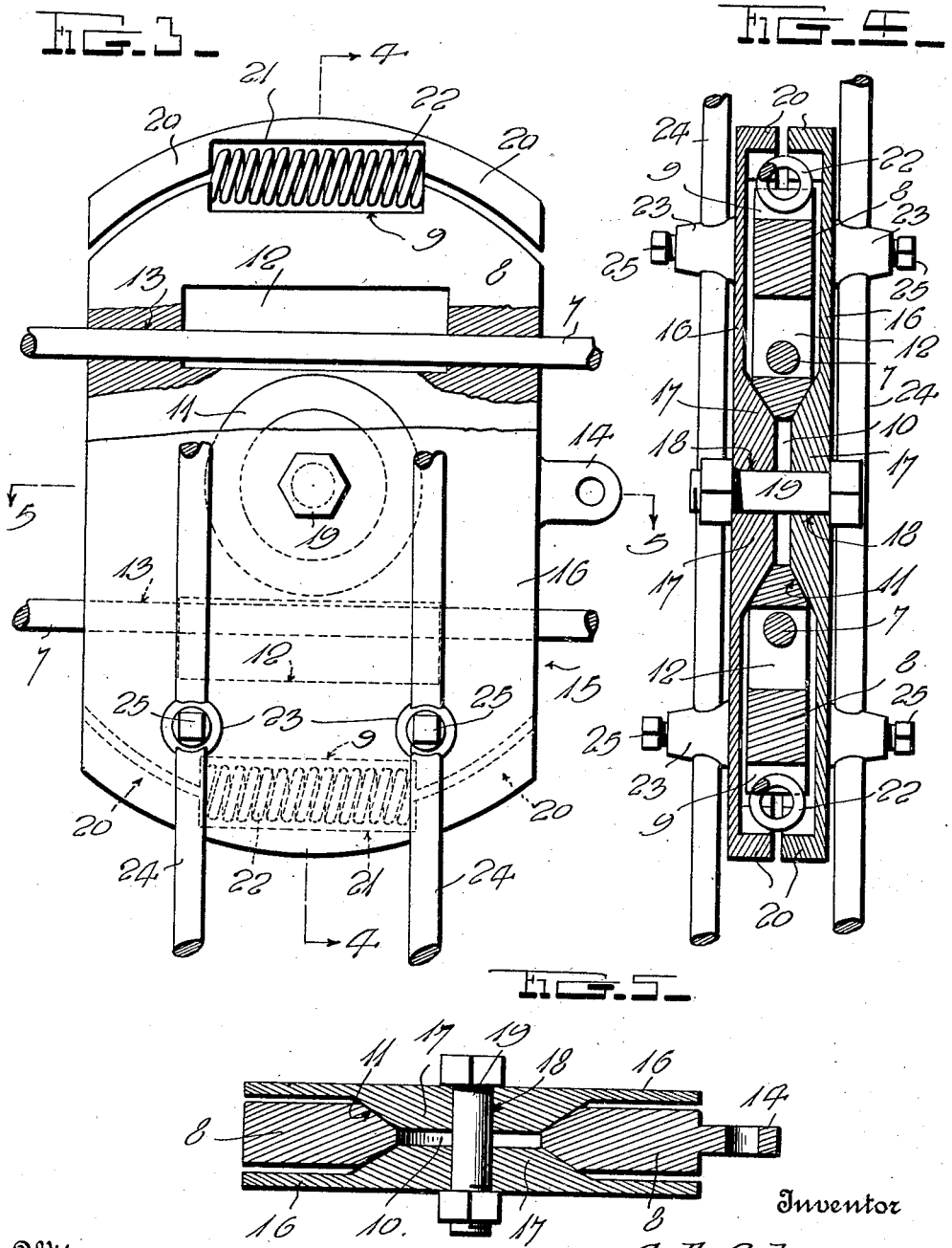

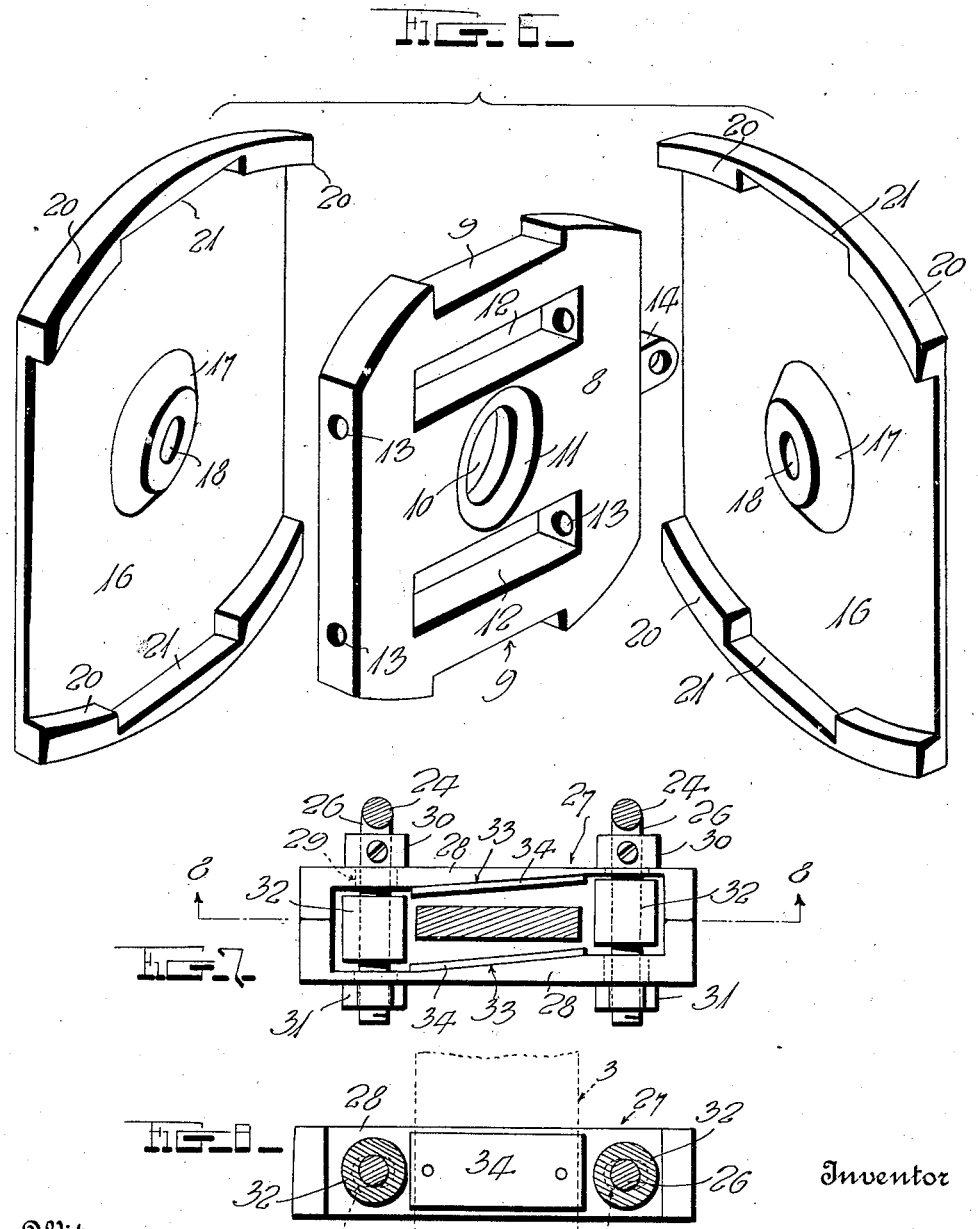

CLINTON E. SCHRYVER, OF CHICAGO, ILLINOIS.

BELT SHIFTER.

1,427,702.

Specification of Letters Patent. Patented Aug. 29, 1922.

Application filed January 31, 1921. Serial No. 441,426.

*To all whom it may concern:*

Be it known that I, CLINTON E. SCHRYVER, a citizen of the United States, residing at Chicago, in the county of Cook and State of Illinois, have invented certain new and useful Improvements in Belt Shifters; and I do declare the following to be a full, clear, and exact description of the invention, such as will enable others skilled in the art to which it appertains to make and use the same.

The present invention relates generally to speed changing devices, but more particularly to belt shifters for step pulleys sometimes called cone pulleys.

The principal object of the invention is to provide a device by which the portion of a belt passing around one step of a pulley may be changed to a smaller step and the portion of the belt passing around the other pulley may be changed to the corresponding larger step without requiring the operator to touch or otherwise manipulate the belt.

A further object of the invention is to generally improve upon devices of this character by the provision of one which will be of extremely simple, strong, durable and inexpensive construction, and one which will be efficient and reliable in operation and well adapted to the purpose for which it is designed.

With the above and other objects in view, the invention consists of the combination and arrangement of parts as are hereinafter fully described and claimed, and illustrated in the accompanying drawings in which similar reference numerals are used to designate similar parts throughout the various views, and in which:

Fig. 1 is a front elevation of a belt shifter constructed in accordance with this invention, and illustrating it applied in connection with a pair of cooperating step pulleys.

Fig. 2 is an end view of the mechanism illustrated in Fig. 1.

Fig. 3 is an enlarged front view, partly broken away and in section, of that portion of the device which may be termed the hub member and the block.

Fig. 4 is a vertical sectional view of this portion of the apparatus taken substantially on the plane indicated by the line 4—4 of Fig. 3.

Fig. 5 is a horizontal sectional view of this portion of the device taken substantially on a plane indicated by the line 5—5 of Fig. 3.

Fig. 6 is a perspective view of the above referred to block and sections of the hub member disassembled.

Fig. 7 is an edge view of one of the belt keepers, and

Fig. 8 is a longitudinal sectional view taken substantially on the plane indicated by the line 8—8 of Fig. 7.

In the drawings above briefly described a pair of cooperating step pulleys is shown, the numeral 1 designating the upper pulley and the numeral 2 designating the lower pulley. Passing around these pulleys so that motion may be imparted to one from the other is a belt 3. This belt 3 is shown as passing around the smallest step of the upper pulley 1 and the largest step of the lower pulley 2.

It must be understood that the pulleys 1 and 2 are fixed upon shafts mounted in a room or shop, the ceiling of which is designated by the numeral 4. Fixed to the ceiling 4 and depending therefrom are spaced upright standards 5 having secured thereto by means of adjustable clamps 6 a pair of guide rods 7. These guide rods 7 are disposed between the pulleys 1 and 2 and are arranged substantially parallel with the shafts or axes of these pulleys.

Slidably mounted for longitudinal adjustment upon the guide rods 7 is a block 8. The side edges of this block 8 are preferably flat or straight and parallel to each other. The end or upper and lower edges of the block are preferably arcuate and are provided at their intermediate portions with notches 9.

Extending through the central portion of the block is an opening 10. The opposite sides or faces of the block adjacent to the opening 10 are provided with conical shaped recesses 11. Extending through the block from one face to the other and disposed between the opening 10 and the notches 9 are elongated openings 12, which serve merely to reduce the weight of the block. Extending through the block across the width of the same from one side edge to the other side edge are apertures 13. The aforementioned guide rods 7 extend through these apertures 13, so that the block 8 is slidably mounted upon the guide rods.

Turnably mounted upon the block 8 is a hub member 15 which is preferably sectional, being constructed of two plates 16 positioned on opposite sides of the block 8. The inner sides or faces of these plates 16 are provided with convex cone shaped bosses 17, which fit into the recesses 11 in the opposite faces of the block 8. Extending centrally through the plates 16 and bosses 17 are apertures 18. The aperture of one plate is aligned with the aperture of the other plate so that they receive a bolt 19, the head of which bears against the outer face of one plate, while the nut at its other end bears against the outer face of the other plate, whereby the two plates are held together. The plates 16 are provided at their ends or upper and lower edges with inwardly extending flanges 20, which pass over and under the ends or upper and lower edges of the block 8. The intermediate portions of the inner sides of these flanges 20 are provided with notches 21 of a size corresponding to the notches 9 in the block 8. These notches 21 are disposed opposite to the notches 9 in the block 8. Confined within the spaces formed by the opposing notches 9 and 21 are coil springs 22, the ends of which bear against the shoulders formed at the edges of said notches.

Projecting from the outer sides of the plates 16 are pairs of bosses 23 provided with transverse apertures which are aligned with each other longitudinally of the plates 16 so as to receive rods 24. The bosses 23 are also provided with longitudinal apertures, in which are disposed set screws 25 provided for the purpose of clamping the rods 24 in place. The free ends of these rods 24 are bent outwardly almost at right angles as at 26 and these portions 26 carry belt keepers 27. The belt keepers 27 each comprises a pair of plates 28 having their ends inturned and those of one plate abutting those of the other. The plates 28 are provided intermediate of their width and adjacent ends with elongated openings 29, through which the outwardly extending ends 26 of the rods 24 are extended. These portions 26 of the rod have collars 30 fixed thereto and disposed in contact with the outer side of one of the plates, while threaded upon the extremities of the portions 26 and bearing against the outer side of the other plate are nuts 31. The two plates are clamped together and fixed upon the portions 26 of the rods 24 by means of these collars 30 and nuts 31. Revolvably mounted upon those portions of the outwardly extending ends 26 of the rods 24 which are disposed between the plates 28 are rollers 32. The inner faces of the plates 28 are provided with inclined surfaces 33, to which are secured in any suitable manner wearing plates 34.

As clearly shown by Figs. 1 and 2 of the drawings the rods 24 are adjusted in the bosses 23 so that the keepers 27 will be disposed adjacent the pulleys 1 and 2. One keeper receives one stretch of the belt 3 while the other keeper receives the other stretch of the belt.

In order to adjust the block 8 along the rods 7, the ear 14 is connected by a link 35 to a lever 36, the upper end of which is pivoted to the ceiling 4.

The operation of the device is as follows:

Assuming that the device is in the position as shown in Figs. 1 and 2 with the belt 3 passing over the smallest step of the upper pulley 1 and over the largest step of the lower pulley 2, should it be desired to change the relative speed of the pulleys so as to cause the belt to pass over the intermediate step of the pulley 1 and the intermediate step of the pulley 2, it is only necessary to swing the lever 36 a short distance to the right. In so doing the block 8 is slid along the guide rods 7, and since the hub member 15 is carried by it, it will be moved so as to shift the belt 3 from the largest step of the pulley 2 to the intermediate step thereof. Upon this movement of the parts, the edge of that portion of the belt 3 passing over the smallest step of the pulley 1 will engage or abut against the end of the intermediate step of the pulley 1. In doing this the hub member 15 will be moved or turned out of its normal registering position with respect to the block 8, thus placing the springs 22 under additional compression between the shoulders at one edge of the notches 9 and the shoulders at the opposite edges of the notches 21. Then, as soon as the portion of the belt 3 passing around the lower pulley 2 is disposed upon the intermediate step of the latter, the belt will be slackened, and the force of the springs 22 upon the hub member 15 tending to restore the latter to its normal position will cause the belt to be shifted from the smallest step of the pulley 1 to the intermediate step thereof. In a similar manner the belt can be shifted onto the largest step of the pulley 1 and smallest step of the pulley 2, and when in this position can be again shifted back to the position shown in Fig. 1, but in doing the latter, the movement of the parts are the reverse from that above described.

From the foregoing it will be seen that the invention can be used to considerable advantage, as by it a belt can be shifted without requiring the operator to either stop the machine or else to place his hands upon any part of the mechanism except the lever 36.

It will be noted that the device may be modified so as to adapt it for use in connection with other forms of machines than is herein shown and described, and hence it is to be understood that various changes in form, proportion and in the minor details of construction may be resorted to without departing from the scope of the invention and now defined.

What is claimed is:

1. The combination with a pair of cooperating step pulleys and a belt passing there around, of a stationary guide disposed between said pulleys, a block slidably mounted for longitudinal adjustment upon said guide, a hub member turnably mounted upon said block, belt keepers carried by said hub member and disposed adjacent said pulleys, said keepers receiving portions of said belt adjacent said pulleys, and yieldable means for normally maintaining said hub member in the position where said keepers are disposed opposite corresponding steps on said pulleys, said means permitting said hub member to yield out of its normal position and to automatically restore it to normal position when moved out of the same, and means for sliding said block along said guide.

2. The combination with a pair of cooperating step pulleys and a belt passing there around, of a stationary guide disposed between said pulleys, a block slidably mounted for longitudinal adjustment upon said guide, a hub member turnably mounted upon said block, belt keepers carried by said hub member and disposed adjacent said pulleys, said keepers receiving said belt at points adjacent said pulleys, compression springs interposed between said block and said hub member for normally maintaining said hub member in the position where said keepers are disposed opposite corresponding steps of said pulleys, said springs permitting said hub member to be moved out of its normal position and when so moved to automatically return it to normal position, and means for sliding said block along said guide.

3. The combination with a pair of cooperating step pulleys and a belt passing there around, of a stationary guide disposed between said pulleys, a block mounted for longitudinal adjustment upon said guide, a hub member turnably mounted upon said block, belt keepers carried by said hub member and disposed adjacent said pulleys, said keepers receiving said belt at points adjacent said pulleys, cooperating shoulders formed on said block and said hub member, compression springs confined between said shoulders for normally maintaining said hub member in the position where said keepers are disposed opposite corresponding steps on said pulleys, said springs permitting said hub member to yield out of its normal position and when yielded to automatically return it to normal position, and means for sliding said block along said guide.

4. The combination with a pair of cooperating step pulleys and a belt passing there around, of a stationary guide disposed between said pulleys, a block slidably mounted for longitudinal adjustment upon said guide, the upper and lower edges of said block being provided with intermediate notches, a hub member turnably mounted upon said block and having flanges extending over and under said upper and lower edges of said block respectively and provided with notches opposing those in the latter, belt keepers carried by said hub member and disposed adjacent said pulleys, said keepers receiving said belt at points adjacent said pulleys, and coil springs confined in said notches between the shoulders formed at the edges thereof for normally maintaining said hub member in the position where said keepers are disposed opposite corresponding steps on said pulleys, said springs permitting said hub member to yield out of its normal position, and when so yielded to automatically return it to normal position.

5. The combination with a pair of cooperating step pulleys and a belt passing there around, of a stationary guide disposed between said pulleys, a block slidably mounted for longitudinal adjustment upon said guide, a hub member turnably mounted upon said block and comprising a pair of plates disposed on opposite sides thereof, belt keepers carried by said plates and disposed adjacent said pulleys, said keepers receiving said belt at points adjacent said pulleys, and coil springs interposed between said block and said plates to normally maintain said plates in the position where said keepers are disposed opposite corresponding steps on said pulleys, said springs permitting said plates to be moved out of their normal positions and when so moved to automatically return them to their normal positions.

6. The combination with a pair of cooperating step pulleys and a belt passing there around, of a stationary guide disposed between said pulleys, a block slidably mounted for longitudinal adjustment upon said guide, and having cone shaped recesses in its opposite spaces, a pair of plates disposed on opposite sides of said block and provided on their inner faces with cone shaped bosses fitting into said recesses, a bolt extending through said plates and their bosses to fix said plates together, belt keepers carried by said plates and disposed adjacent said pulleys, said keepers receiving said belt at points adjacent said pulleys, and spring means confined between said plates and said block to normally maintain said plates in the position where said keepers are disposed opposite corresponding steps on said pulleys, said means permitting said plates to yield out of their normal positions and when so yielded to automatically return them to normal positions.

7. The combination with a pair of cooperating step pulleys and a belt passing there around, of a stationary guide disposed between said pulleys, a block slidably mounted for longitudinal adjustment upon said guide, said block being provided with a central opening and centrally disposed cone shaped recesses on its opposite sides, the upper and lower edges of said block being provided with intermediate notches, plates disposed on opposite sides of said block and provided with central apertures and with cone shaped bosses on their inner sides fitting into said recesses, a bolt passing through the apertures of said plates and the opening of said block to fix said plates together, flanges extending inwardly from the upper and lower edges of said plates and provided on their inner sides with intermediate grooves disposed opposite the grooves of said block, belt keepers carried by said plates and disposed adjacent said pulleys, said keepers receiving said belt at points adjacent said pulleys, and coil springs disposed in said notches and confined between the shoulders at the edges thereof to normally maintain said plates in the position where said keepers are disposed opposite corresponding steps on said pulleys, said springs permitting said plates to yield out of their normal positions, and when so yielded to automatically return them to their normal positions.

8. The combination with a pair of cooperating step pulleys and a belt passing there around, of a stationary guide disposed between said pulleys, a block slidably mounted for longitudinal adjustment upon said guide, a pair of plates disposed on opposite sides of said block and turnably mounted there upon to move in unison, rods carried by said plates and mounted for longitudinal adjustment, belt keepers carried by said rods and disposed adjacent said pulleys, and means whereby said plates will be normally maintained in the position where said keepers are disposed opposite corresponding steps on said pulleys, said means permitting said plates to yield out of their normal positions and when so yielded to return to their normal positions.

In testimony whereof I have hereunto set my hand.

CLINTON E. SCHRYVER.